Nov. 20, 1923.  1,474,356

J. C. FRENCH

LOADING AND CONVEYING APPARATUS

Filed Feb. 13, 1919    7 Sheets-Sheet 1

Nov. 20, 1923.

J. C. FRENCH 1,474,356

LOADING AND CONVEYING APPARATUS

Filed Feb. 13, 1919    7 Sheets-Sheet 3

Fig. 5

WITNESSES:

INVENTOR
J. C. French
BY
ATTORNEY

Nov. 20, 1923.  1,474,356
J. C. FRENCH
LOADING AND CONVEYING APPARATUS
Filed Feb. 13, 1919    7 Sheets-Sheet 4

Nov. 20, 1923.　　　　　　　　　　　　　　　　1,474,356
J. C. FRENCH
LOADING AND CONVEYING APPARATUS
Filed Feb. 13, 1919　　　　7 Sheets-Sheet 5

WITNESSES:　　　　　　　　　　　　　　　　INVENTOR
　　　　　　　　　　　　　　　　　　　　　　J. C. French
　　　　　　　　　　　　　　　BY
　　　　　　　　　　　　　　　　　　　　　　ATTORNEY

Nov. 20, 1923.

J. C. FRENCH 1,474,356

LOADING AND CONVEYING APPARATUS

Filed Feb. 13, 1919   7 Sheets-Sheet 6

WITNESSES:

INVENTOR
J. C. French
BY
ATTORNEY

Nov. 20, 1923.

J. C. FRENCH 1,474,356

LOADING AND CONVEYING APPARATUS

Filed Feb. 13, 1919   7 Sheets-Sheet 7

WITNESSES:

INVENTOR
J. C. French
BY
ATTORNEY

Patented Nov. 20, 1923.

1,474,356

UNITED STATES PATENT OFFICE.

JAMES C. FRENCH, OF CHICAGO, ILLINOIS, ASSIGNOR, BY MESNE ASSIGNMENTS, TO F. C. AUSTIN MACHINERY COMPANY, A CORPORATION OF ILLINOIS.

LOADING AND CONVEYING APPARATUS.

Application filed February 13, 1919. Serial No. 276,71*.

To all whom it may concern:

Be it known that I, JAMES C. FRENCH, a citizen of the United States of America, and a resident of Chicago, Illinois, have invented a certain new and useful Improvement in Loading and Conveying Apparatus, of which the following is a specification.

This invention relates to apparatus for conveying materials to the loading hopper of a mixing machine, or to any other receptacle, and more particularly to those used in conjunction with portable mixing plants. In the use of apparatus of this kind, the materials, such as sand and gravel, are dumped in heaps on the street, and are then delivered to the loading hopper of the mixer. This has been done in various ways.

Generally stated, therefore, the object of this invention is to provide a novel and improved apparatus for transferring the materials from the surface of the street to the loading hopper of the mixer, or to any other receptacle, in a more expeditious and satisfactory manner than heretofore, and with less manual labor.

Special objects are to provide certain details and features of construction and combinations tending to increase the general efficiency and the desirability of a conveying and loading apparatus of this particular character.

To these and other useful ends the invention consists in matters hereinafter set forth and claimed.

In the accompanying drawings—

Fig. 4 is an enlarged detail sectional view of a portion of one of the loading machines.

As thus illustrated, the apparatus comprises a long portable conveyer comprising a frame 1 supported on wheels 2 and 3, the latter being driven from an engine within the hood or housing 4 carried by the body frame. At its delivery end this conveyer has an upwardly tilted portion 5 which will overhang the loading hopper 6 of the concrete mixer, when the apparatus is in use on the street, and the conveyer belt 7 travels around the pulleys 8 at the receiving end of the conveyer and around the pulleys 9 at the discharge end thereof, and is supported at intermediate points by other pulleys 10, 11, 12 and 13, so that the belt runs smoothly and practically without friction to carry the materials to the discharge end of the conveyer. The conveyer belt 7 is driven by a sprocket chain connection 14 extending to said engine. With this construction, the long portable conveyer can be moved around on the street, and is adapted to receive at different points in its length the sand and gravel or crushed rock or other materials to be delivered to the loading hopper of the mixer.

In use, the materials are dumped in two long heaps or piles 15 and 16, at opposite sides of the portable conveyer, and these materials are then transferred to the conveyer belt 7 to be transported to the loading hopper of the mixer. For this purpose, the two loading machines A and B are provided and arranged to work at opposite sides of said portable conveyer. The two machines are practically alike, except that one is a right hand machine and the other is a left hand machine, as shown, so that they both start at the ends of the heaps or masses 15 and 16 nearest the traction wheels 3 of the portable conveyer, and then gradually work toward the end of the portable conveyer which has the pulley or roll 8 previously described. A description of one of these loading machines will, therefore, be sufficient.

Figure 7:
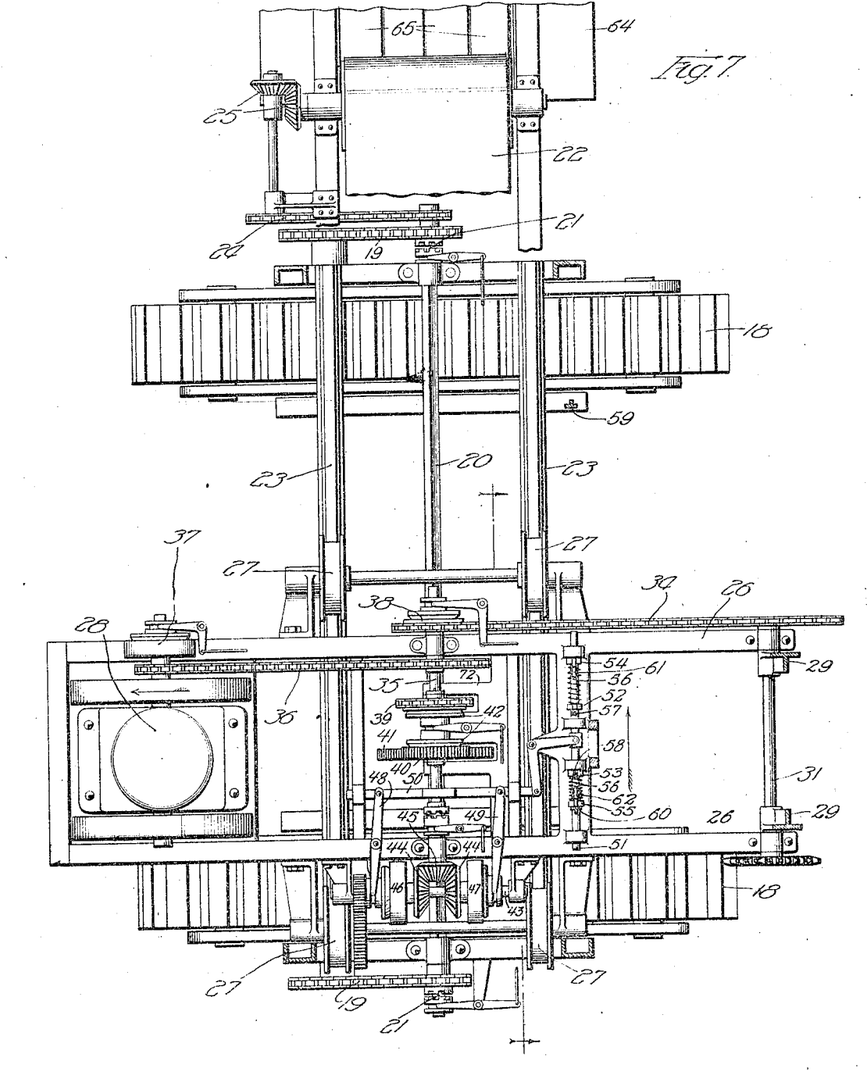
Fig. 7 is an enlarged plan of one of the portable or self-propelled loading machines, with certain portions thereof omitted for convenience of illustration, and to bring into view certain parts below.
Figure 8:
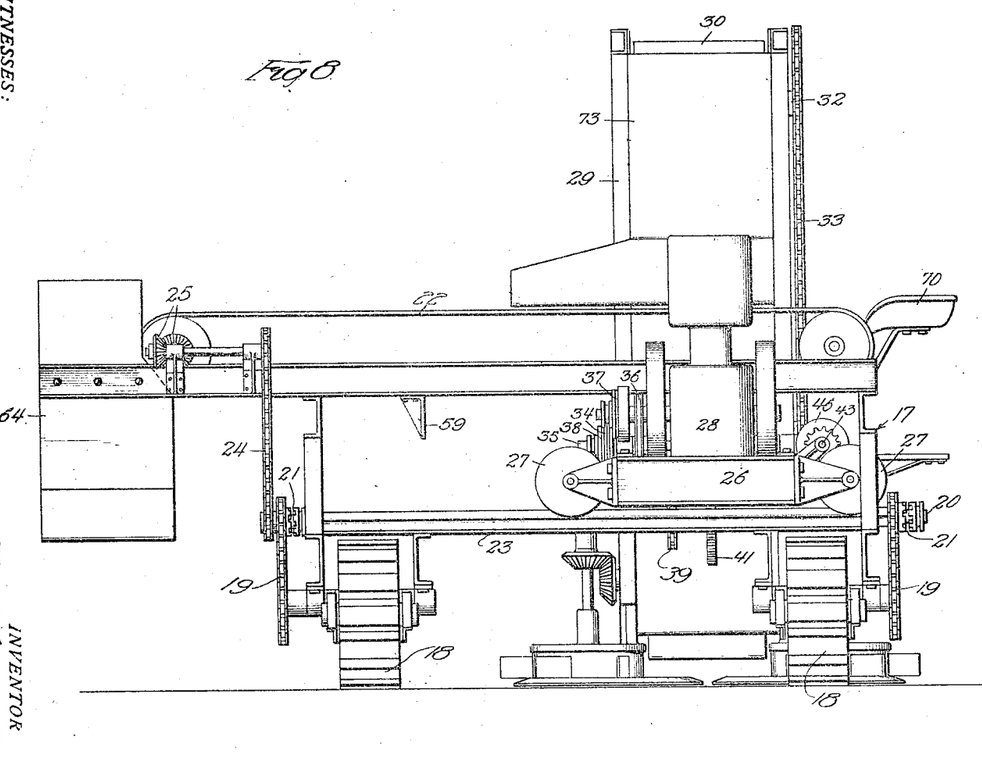
Fig. 8 is a rear elevation, on a smaller scale, of said loading machine.
Figure 9:
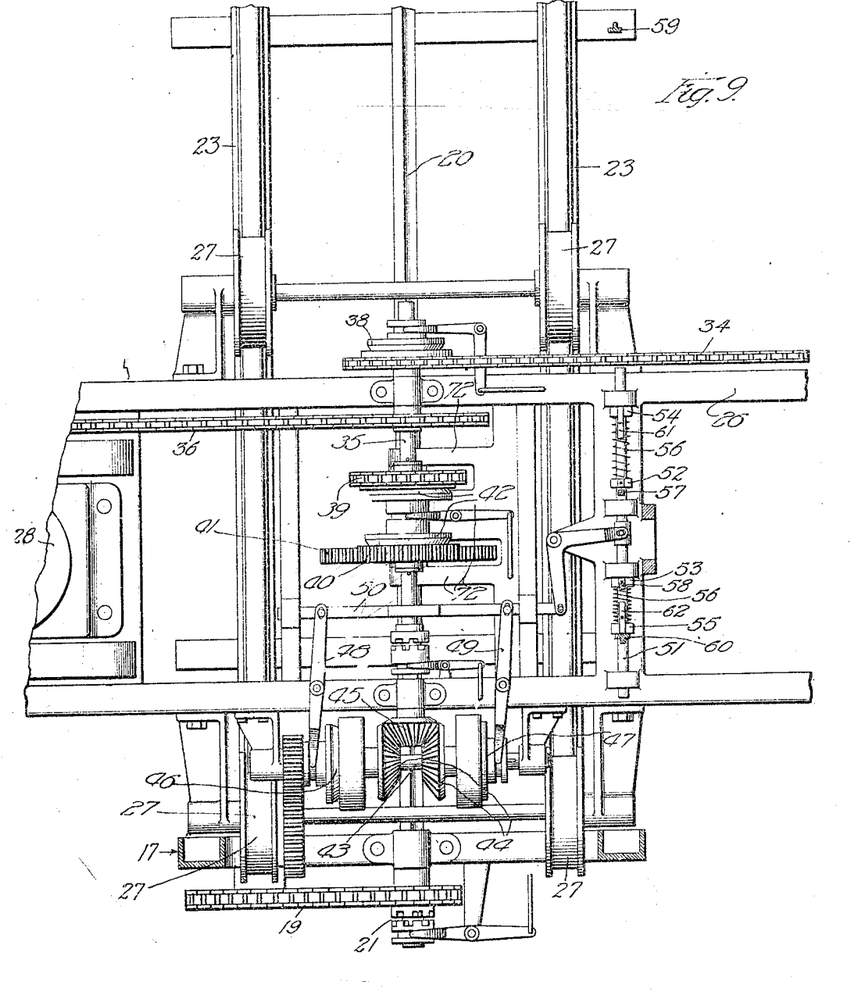
Fig. 9 is an enlarged plan of a portion of the mechanism shown in Fig. 7.

The loading machine A comprises a body frame 17 mounted on caterpillar traction belts 18, in any suitable or desired manner, said traction belts being driven by sprocket chain connections 19 with the opposite ends of the transversely arranged square shaft 20, the latter being mounted in suitable bearings on said body frame. Clutches 21 control the transmission of power from this shaft to the sprocket chains 19, whereby the two caterpillar traction devices can be operated simultaneously or one at a time, and whereby the machine can be driven straight ahead, or turned to the right or the left, or turned clear around. A transversely arranged belt conveyer 22 is disposed over the tracks 23 which are mounted on said body frame, one end of said transverse conveyer projecting laterally far enough to extend over the portable conveyer having the belt 7 previously described. This transverse conveyer 22 is preferably driven by a sprocket chain connection 24 from the shaft 20, there being a bevel gear connection 25 between this sprocket chain and the conveyer, whereby rotation of the shaft 20 serves not only to propel the traction belts 18, but also to operate the transverse conveyer. The laterally shifting auxiliary frame 26 is provided with wheels 27 that travel on the tracks 23, thereby providing a carriage or truck which is adapted to reciprocate or travel back and forth from one side of the loading machine to the other. An internal combustion engine or other prime mover 28 is mounted upon the rearwardly projecting end portion of the frame 26, and an endless bucket elevator comprising the tilting frame 29 with its endless chain of buckets 30 is pivotally mounted on the shaft 31 at the forwardly projecting end of the frame 26, thus providing a means for scooping up the materials on the street, and carrying them upwardly and then discharging them onto the transverse conveyer 22, so that the said materials will then be discharged onto the portable conveyer. The shaft 31 is connected with the upper shaft 32 of the elevator by the sprocket chain 33, and the shaft 31 is connected by a sprocket chain 34 with the short transverse shaft 35 which is mounted in bearings on the central portion of the frame 26, directly above the long shaft 20; and this shaft 35 is connected by a sprocket chain 36 with the said engine or prime mover, through the medium of a clutch 37 to control the transmission of power; and a similar clutch 38 controls the transmission of power from the shaft 35 to the sprocket chain 34, in a manner that will be readily understood. The shaft 35 is connected with the shaft 20 by a sprocket chain 39, in order to rotate the shaft 20 in one direction, and the spur gears 40 and 41 on these two shafts provide the means for reversing the direction of rotation of the shaft 20, whereby the latter can be driven in either direction to cause the caterpillar traction belts 18 to propel the loading machine either forward or backward. This is done through the medium of the reversing clutch mechanism 42 of any suitable character, mounted on the shaft 35 between the gear 40 and the sprocket chain 39, so that the transmission of power can be entirely interrupted, when it is desired to stop the rotation of the shaft 20, and whereby the latter can be rotated in either direction at will. The shaft 43 that is geared to the axle of two of the wheels 27 is provided with a pair of loose bevel gears 44 which are rotated constantly in opposite directions by the bevel pinion 45 on the end of the short shaft 35, and friction clutches 46 and 47 are provided to control the transmission of power from these bevel gears 44 to the shaft 43, so that the latter can be rotated in either direction, depending upon which of the two bevel gears 44 is coupled to the axle. In other words, the closing of the clutch 46 will rotate the shaft 43 in one direction, while the opening of this clutch and the closing of the clutch 47 will then reverse the rotation of said shaft. This reversing gear, through which power is transmitted to propel the auxiliary frame 26 back and forth on the main body frame, is preferably controlled automatically through the medium of levers 48 and 49 which engage, respectively, the clutches 46 and 47, and which are connected together by an endwise reciprocating bar or member 50 supported in any suitable manner. The auxiliary frame 26 is provided with a reciprocating rod 51 arranged parallel with the shaft 20, and this rod 51 has a bell crank connection with one end of the bar 50, whereby reciprocation of the rod 51 will cause the bar 50 to move endwise, thereby to control the clutches 46 and 47, and in this way to reverse the direction of travel of the auxiliary frame. For this purpose, the rod 51 is provided with fixed collars 52 and 53, and with sliding collars 54 and 55; and between each fixed collar and its oppositely arranged sliding collar a coil spring 56 is interposed for compression. The auxiliary frame 26 is provided with pivoted catches 57 and 58 for engaging the collars 52 and 53, and the main body frame is provided with stops 59 and 60 for engaging, respectively, the sliding collars 54 and 55, whereby the automatic reversal of the direction of travel of the auxiliary frame 26 is accomplished. It will be seen, for example, that when the collar 55 engages the stop 60, thereby compressing the spring 56, the rod 51 will be reciprocated endwise until the fixed collar 52 is caught and held by the pivoted catch 57, with the result that the two clutches 46 and 47 are controlled to automatically reverse the direction of travel of the auxiliary frame 26; and then when the collar 54 engages the stop 59, the spring 56 will be compressed, and the rod 51 will be shifted endwise, so that the collar 53 will then be caught and held by the catch 58; and this endwise reciprocation of the rod 51 will again control the clutches 46 and 47 and reverse the direction of travel of the auxiliary frame. It will be observed that the upper ends of the collars 54 and 55 have beveled portions 61 and 62 for tripping the catches 57 and 58, thereby to permit the springs 56 to shift the rod 51 endwise alternately in opposite directions. Thus, with this arrangement, the reversing gear comprising the bevel gears 44 and 45 and the clutches 46 and 47 is automatically controlled by the back and forth motion of the auxiliary frame 26, so that the latter reverses its own motion, so to speak, and continues to travel back and forth or oscillate as long as power is communicated to the shaft 35 from the engine. This oscillating or back and forth movement causes the lower end of the elevator having the buckets 30 to work back and forth across the long pile or heap of materials 16, while the caterpillar belts 18 are operated slowly, or from time to time, to cause the loading machine to travel forward in a direction parallel with the belt 7 of the portable conveyer. Preferably, the lower end of said elevator is provided with a pair of rotary feeding devices 63, of any suitable character, for throwing the sand or gravel or other materials into the mouths of the buckets as the latter travel forward while passing from the downward path of travel to their upward direction of travel. For example, these rotary feeding devices can be of the kind shown and described in my Patent No. 1,409,695. These rotary feeding devices, it will be understood, are driven through the medium of suitable connection through the lower end of the elevator, so that when the elevator is operated the feeding devices are operated also. Thus, with this arrangement, these feeding devices and the elevator operate back and forth across the long pile or heap of materials and in time the materials are entirely taken up from the surface of the street, so that the latter is left clean.

Figures 1, 2:
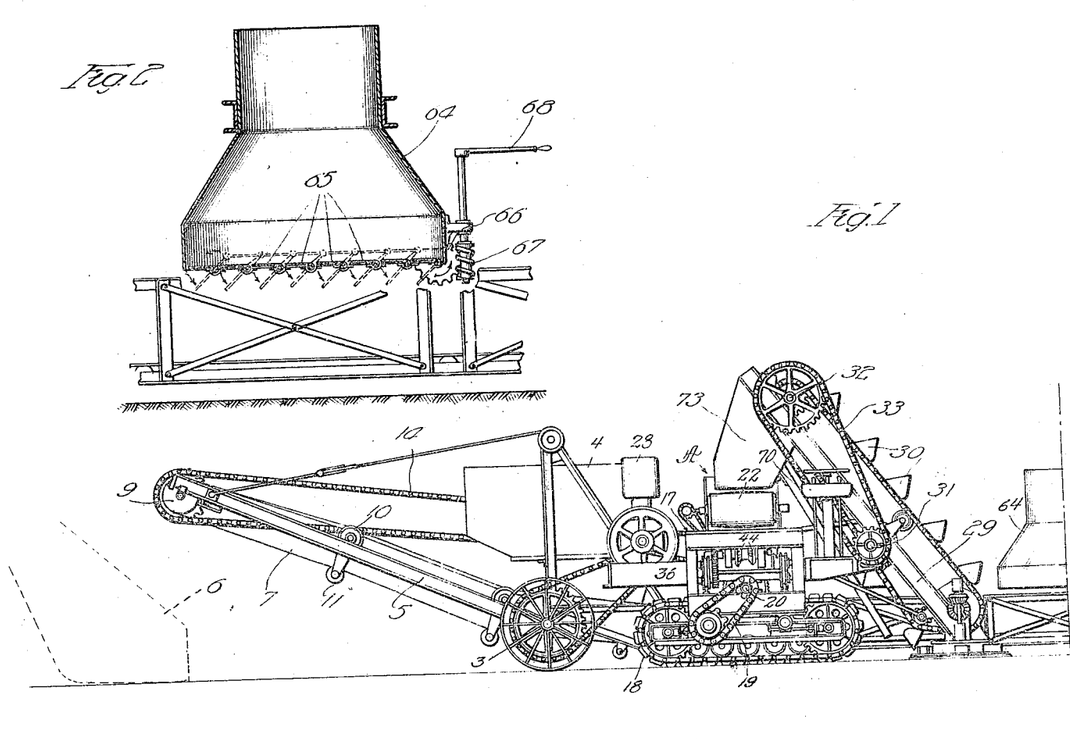
Fig. 1 is a side elevation of a loading and conveying apparatus embodying the principles of the invention, with one end portion of said apparatus omitted.
Fig. 2 is a detail sectional view of one of the measuring devices by which the materials are delivered in batches to the traveling conveyer which extends along the street, and by which the materials are conveyed to the loading hopper of the mixer.
Figure 2:
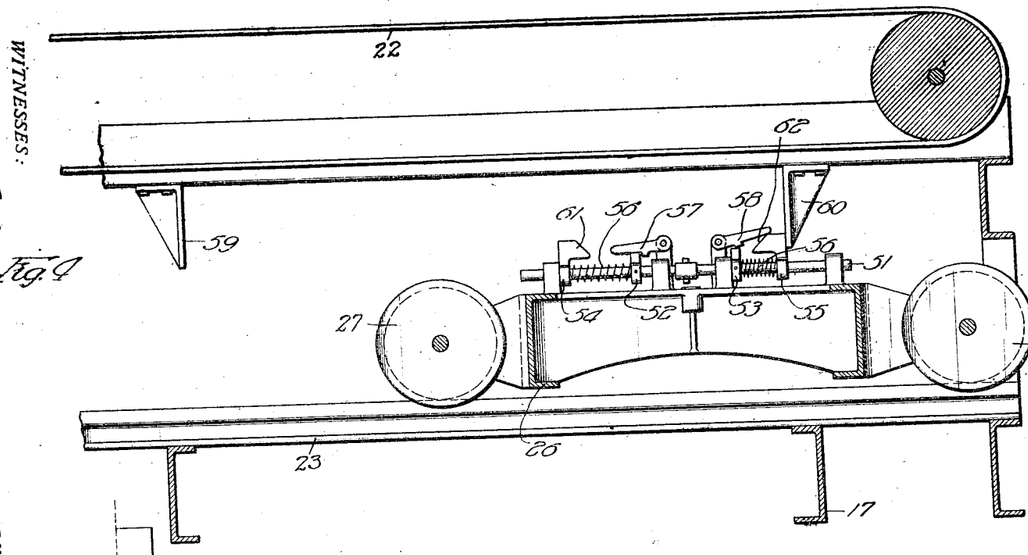
Figure 3:
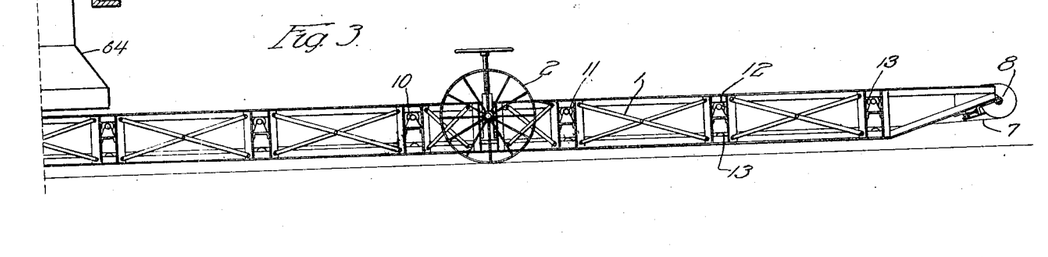
Fig. 3 is a side elevation of that portion of the apparatus which is omitted in Fig. 1.
Figure 5:
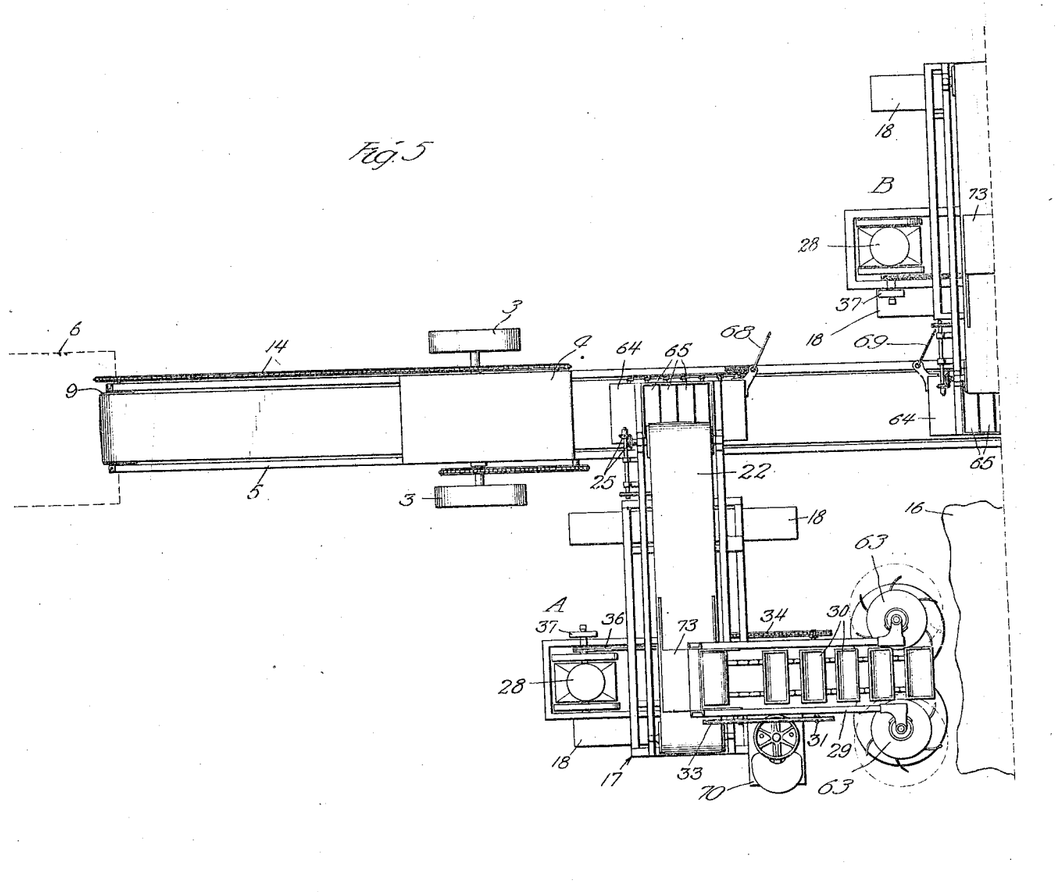
Fig. 5 is a plan of the apparatus shown in Fig. 1.
Figure 6:
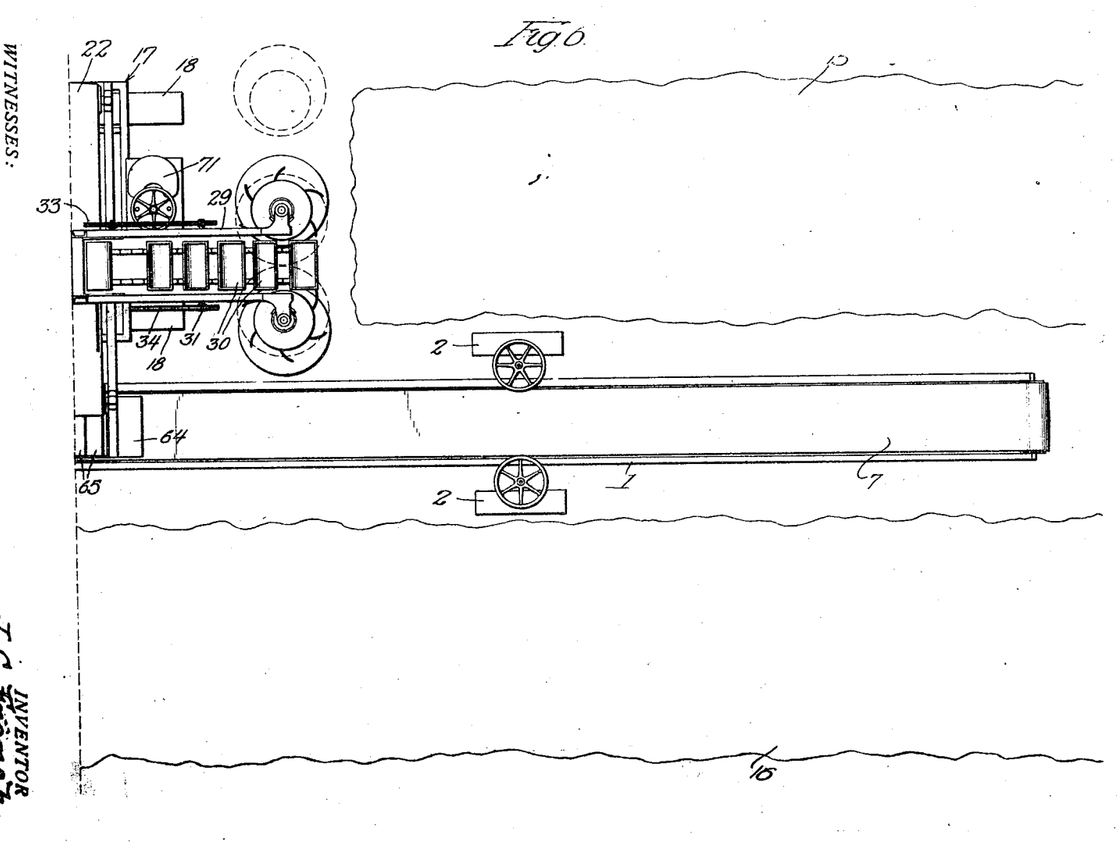
Fig. 6 is a plan of the apparatus shown in Fig. 3.

Preferably, in apparatus of this character, involving mechanical loaders as a substitute for the manual shoveling of the materials onto the belt 7 of the portable conveyer, the transverse belt conveyer 22 has its overhanging end provided with a measuring device by which to discharge the materials in measured or predetermined quantities onto said portable conveyer. The said measuring device can be of any suitable character, as for example such as shown in Fig. 2; and as thus illustrated, said device comprises a hopper 64 which is hung on the projecting end of the transverse conveyer, and which is provided at its lower end with pivoted valves 65 which are connected together in any suitable manner for operation in unison. These valves 65 are connected with an oscillatory worm gear 66 which engages the worm or screw 67, the latter having a handle 68 by which the worm gearing thus provided can be operated to control the valve mechanism at the bottom of said hopper. It will be understood that the loader B at the other side of the portable conveyer is provided with a similar measuring device having a handle 69 for the operation thereof. With this arrangement, an attendant standing at one side of the portable conveyer can operate the handles 68 and 69 to discharge measured or predetermined quantities of the sand or gravel or other materials upon the top of the portable conveyer, so that the latter will deliver these materials in the proper proportions to the previously mentioned hopper 6 of the portable mixing plant. The two loaders A and B are provided respectively with seats 70 and 71, so that the operator of each machine can control the various clutches at will, suitable connections being provided for this purpose. In other words, on the loading machine A, the clutches 21, 37, 38 and 42 are all adapted to be manually controlled, of course, and for this purpose may be connected with the usual or any suitable levers or other controlling instrumentalities disposed in front of the driver or operator who occupies the seat of the machine.

It will be understood, of course, that the transmission of power from the shaft 35 to the shaft 20 is of such character that the sprocket wheel for the lower portion of the sprocket chain 39 and also the gear wheel 41 are adapted to slide back and forth on the shaft 20, the latter being square for that purpose. This is preferably accomplished by providing bracket bearings 72 on the frame 26 to slide the said power transmitting elements along the shaft 20, thereby to preserve the operative condition of the reversible power transmitting connection provided between the shaft 35 and the shaft 20, notwithstanding the back and forth motion of the auxiliary frame 26 from one side of the machine to the other during the operation of the apparatus. As stated, the loading machine B is exactly the same in this respect, and the two machines are practically duplicates, except that one is a right hand machine and the other a left hand machine, as previously explained.

With this construction, it will be seen that no manual shoveling is necessary in order to transfer large quantities of sand or gravel or other materials from the street to the portable conveyer belt 7, and that this is accomplished by delivering the materials in measured or predetermined quantities, at the will of the attendant who controls the hand levers 68 and 69, so that no shoveling is necessary in order to convey the materials from the street in batches, or in the desired portions, to the loading hopper of the mixer. The driver of each loading machine causes the machine to travel forward in a direction parallel with the portable conveyer belt 7, and in this way the two long piles or masses of materials are gradually transferred to the belt without the necessity of any manual shoveling whatever.

The elevator of each loading machine preferably has a spout 73, and this spout travels back and forth above the transverse conveyer 22, so that the materials are discharged onto the latter at points in the length thereof.

From the foregoing, it will be seen that the long portable conveyor is self-propelled and self-contained in character, having its own power plant and being capable of receiving materials at any point in the length thereof and of then discharging the same from the front end of the belt conveyor into any suitable receptacle, the power plant being located in rear of the discharge end of the conveyor. Also, of course, the loader having the caterpillars is self-propelled and entirely self-contained in character, and is adapted to operate independently of the conveyor, but the loader and the conveyor are adapted and designed and combined to cooperate in transferring the materials from the street to the mixer or to any other desired machine or place.

What I claim as my invention is:—

1. In apparatus for handling materials, the combination of a portable main frame having a track thereon, a transverse conveyer arranged parallel with and above said track, said transverse conveyer, being supported on the main frame, a shifting frame disposed below said transverse conveyer and provided with wheels to travel on said track, so that said shifting frame is movable back and forth below the transverse conveyer, having provisions to drive said conveyer from the shifting frame, mechanism to automatically reverse the direction of travel of said shifting frame, apparatus carried by the shifting frame to deliver the materials onto said transverse conveyer, and common power means for operating said last mentioned apparatus, said shifting frame and said conveyer.

2. In a machine for handling materials, the combination of a portable main frame having a track thereon, a transverse conveyor arranged parallel with and above said track, said transverse conveyer being supported on the main frame, a shifting frame disposed below said transverse conveyor and provided with wheels to travel on said track, so that said shifting frame is movable back and forth below the transverse conveyor, mechanism to automatically reverse the direction of travel of said shifting frame, and apparatus carried by the shifting frame to deliver the materials onto said transverse conveyor, said shifting frame being of a length to extend a distance outward from each side of said transverse conveyor, a prime mover mounted on one projecting end of said shifting frame, means on the other projecting end of said laterally shifting frame to support said apparatus, a power transmitting connection extending under the transverse conveyor from said prime mover to said apparatus, and means forming a part of said automatic mechanism and arranged to connect the prime mover with at least one of the wheels of said shifting frame.

3. A structure as specified in claim 1, said mechanism comprising a reversing gear through which power is communicated to at least one of said wheels, and instrumentalities controlled by engagement with the main frame in the back and forth motion of said shifting frame to automatically control said reversing gear.

4. In an apparatus for handling materials, the combination of a self-propelled main frame, a transverse conveyer on said main frame, a shifting frame movable transversely of said main frame, means on said shifting frame for gathering materials from the ground and conveying them upwardly to position for discharge onto said conveyer, a power plant on said shifting frame connected to operate said gathering and conveying means and said transverse conveyer, and means for automatically reversing the direction of travel of said frame.

5. In an apparatus for handling materials, the combination of a self-propelled main frame, a transverse conveyer on said main frame, a shifting frame movable transversely of said main frame, means on said shifting frame for gathering materials from the ground and conveying them upwardly to position for discharge onto said conveyer, a power plant on said shifting frame connected to operate said gathering and conveying means and said transverse conveyer, and means for automatically reversing the direction of travel of said frame said reversing means comprising a reversing gear and instrumentalities controlled by engagement with the main frame in the back and forth motion of said shifting frame to automatically control said reversing gear.

JAMES C. FRENCH.